US008365256B2

(12) United States Patent
Wong et al.

(10) Patent No.: US 8,365,256 B2
(45) Date of Patent: Jan. 29, 2013

(54) AUTHENTICATION SERVER WITH LINK STATE MONITOR AND CREDENTIAL CACHE

(75) Inventors: Pok Wong, San Jose, CA (US); Thomas Alan Parker, Boulder Creek, CA (US)

(73) Assignee: Cisco Technology, Inc., San Jose, CA (US)

( * ) Notice: Subject to any disclaimer, the term of this patent is extended or adjusted under 35 U.S.C. 154(b) by 1321 days.

(21) Appl. No.: 11/751,831

(22) Filed: May 22, 2007

(65) Prior Publication Data

US 2008/0295157 A1 Nov. 27, 2008

(51) Int. Cl.
G06F 15/16 (2006.01)
(52) U.S. Cl. .......................................................... 726/5
(58) Field of Classification Search ........................ 726/5
See application file for complete search history.

(56) References Cited

U.S. PATENT DOCUMENTS

| 7,437,755 | B2 * | 10/2008 | Farino et al. ..................... 726/5 |
| 2005/0278778 | A1 * | 12/2005 | D'Agostino et al. ............. 726/5 |
| 2006/0129813 | A1 * | 6/2006 | Narayanan et al. ........... 713/168 |
| 2008/0086760 | A1 * | 4/2008 | Jiang et al. ........................ 726/3 |
| 2008/0196090 | A1 * | 8/2008 | Baron et al. ..................... 726/5 |

OTHER PUBLICATIONS

Sankar, Krishna, et al., EAP Authentication Protocols for WLANs, ciscopress.com, Feb. 18, 2005.
Author and date unavailable, "Extensible Authentication Protocol Overview", Microsoft TechNet. © 2007 Microsoft Corporation.

* cited by examiner

*Primary Examiner* — Kambiz Zand
*Assistant Examiner* — Amare F Tabor
(74) *Attorney, Agent, or Firm* — Baker Botts L.L.P.

(57) ABSTRACT

An example embodiment of the present invention provides processes relating to the authentication, by an authentication server, of a supplicant/user for access to a network. In one particular implementation, an authentication server receives a request for access from a supplicant, which request is forwarded to the authentication server by an authenticator that controls a port to the network. The authentication server scores various authentication methods, based on configured preferences, currently cached credentials, and the availability of a networked credential store as measured by a link-state monitor. The authentication server then negotiates an agreed authentication method with the supplicant, using a preferred order resulting from the scores. The authentication server receives forwarded credentials for the agreed authentication method from the supplicant and instructs the authenticator to give the supplicant access to the port, if the authentication server can verify the credentials against a credential store or a credential cache.

17 Claims, 6 Drawing Sheets

AUTHENTICATION SERVER WITH LINK STATE MONITOR AND CREDENTIAL CACHE

TECHNICAL FIELD

The present disclosure relates to computer security and the authentication-authorization-accounting (AAA) servers that implement authentication protocols, such as the Extensible Authentication Protocol (EAP).

BACKGROUND

Before allowing entities to access a network and its associated resources, the general mechanism is to authenticate the entity (a device and/or user) and then allow authorization based on the identity. The most common access control is binary, i.e., it either allows access or denies access based on membership in a group.

Extending access control, especially to the wireless domain, requires the use of a more finely grained authorization. For example, one might want to allow access to the network and its resources for internal employees and allow Internet access for guests. Further access might be allowed based on the entity's membership in identity federations, e.g., inter-college access to researchers, inter-organization access based on collaboration on certain projects, and other similar groups and roles.

Typically, the authentication is based on a three-party model, where the three parties are; (a) the supplicant, which requires access; (b) the authenticator, which grants access; and (c) the authentication server (e.g., a AAA server), which gives permission. The supplicant has an identity and some credentials to prove that it (or its user) is who it claims to be. Examples of credentials are passwords, one-time tokens, digital certificates, and phone numbers (calling/called).

The supplicant connects to the network through an authenticator's port that is access controlled. The port is important because it acts as the choke point for the supplicant's access to the network resources. That is, access to the network can be controlled at a single point. The supplicant is called a peer in the RFCs (Request for Comments) and drafts promulgated by the IETF (Internet Engineering Task Force).

In the wireless domain, the most common supplicant is the STA (Station), e.g., a laptop or PDA, and the authenticator is the access point (AP). The STA to AP cardinality is 1:1; that is, one STA can, at one time, connect to the network through only one AP. This restriction fits well with concept of an access-controlled port in the EAP/802.1x protocol. The authenticator itself does not know whether an entity can be allowed access; that is the function of the authentication server. In the IETF world, the authenticator is often referred to as the network access server (NAS) or Remote Address Dial-In User Service (RADIUS) client. In some cases, the authenticator and the authentication server roles can be performed by one device, such as the 802.11 AP.

In a typical scenario, the supplicant initiates an access request and the authenticator starts an EAP message exchange. (In the stricter sense of the standards, such as 802.1x, the supplicant does not necessarily always initiate the access request, the authenticator can initiate an authentication request when it senses a disabled-to-enabled state transition of a port.) At some point, the authenticator communicates with the authentication server, which decides on an authentication protocol to propose to the supplicant. If the supplicant agrees to the protocol, the authentication server will attempt an authentication according to the protocol against a statically configured credential store and either succeed with the authentication or wait for a timeout to occur. If the authentication succeeds, the authenticator allows network access to the supplicant through the port. The authenticator also keeps a security context with the supplicant-port pair. This context might trigger an event such as a timeout, if the authentication is only for a period of time (e.g., billed access in public WLAN). With respect to the foregoing paragraphs, see Krishna Sankar, Andrew Balinsky, Darrin Miller. Sri Sundaralingam, EAP Authentication Protocols for WLANs (Cisco Press; Feb. 18, 2005).

EAP is a user authentication protocol defined by IETF RFC 3748. Although EAP is not limited to wireless LANs (WLANs) and can be used for wired LAN authentication, it is most often used in WLANs. EAP is an authentication framework, not a specific authentication mechanism. EAP provides some common functions and a means for negotiation of a desired authentication mechanism. Such mechanisms are called EAP methods and they currently number about forty. EAP methods defined in IETF RFCs include EAP-MD5, EAP-OTP, EAP-GTC, EAP-TLS, EAP-IKEv2, EAP-SIM, and EAP-AKA, in addition to a number of vendor specific methods such as EAP-MSCHAP. Common methods capable of operating in wireless networks include EAP-TLS, EAP-SIM, EAP-AKA, PEAP, LEAP and EAP-TTLS. The requirements for EAP methods used in WLAN authentication are described in RFC 4017.

DESCRIPTION OF EXAMPLE EMBODIMENT(S)

In particular embodiments, the present invention provides methods, apparatuses, and systems directed to an authentication server which employs a link-state monitor and/or a credential cache to expedite negotiated access to a network pursuant to authentication protocols. The following example embodiments are described and illustrated in conjunction with apparatuses, methods, and systems which are meant to be examples and illustrative, not limiting in scope.

A. Network Environment

Figure 1:
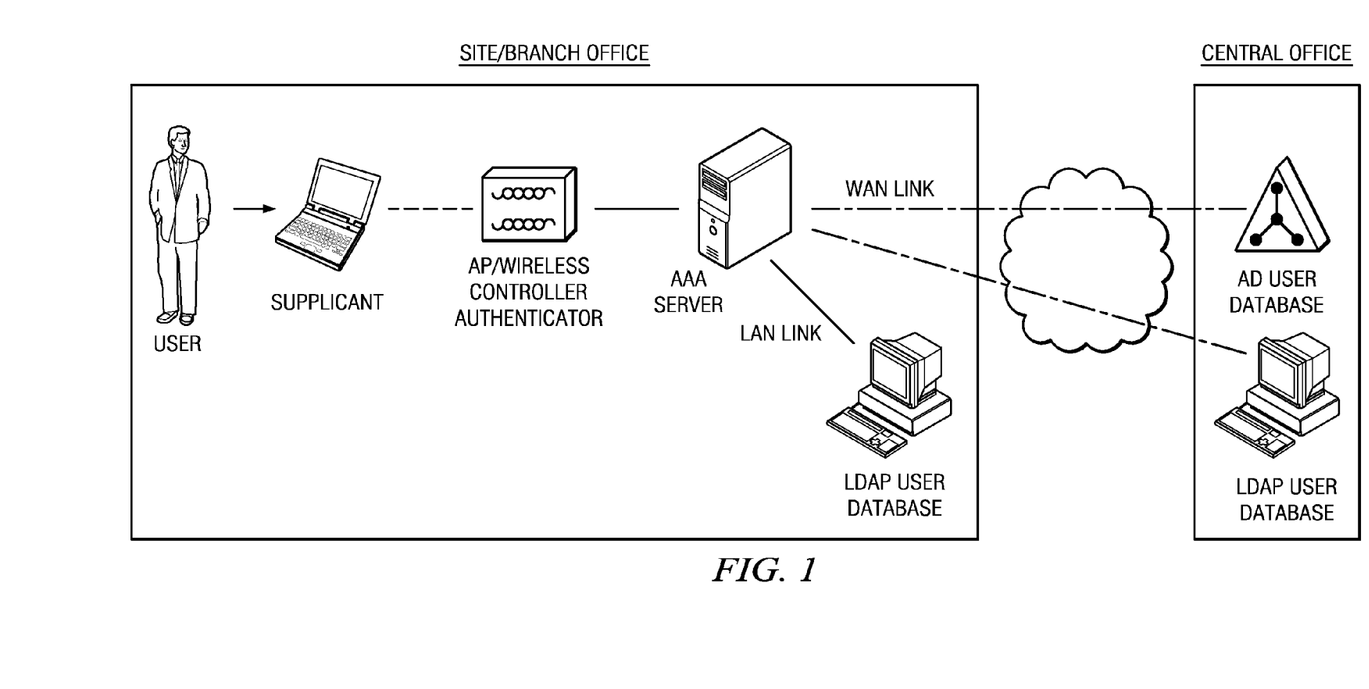
FIG. 1 is a diagram showing a network environment, which might be used with some embodiments of the present invention.

FIG. 1 is a diagram showing a network environment, which might be used with some embodiments of the present invention. In the diagram, a user is located in a site or branch office and the credential stores which maintain the user's or supplicant's credentials are located in a central office. Those credential stores include an LDAP (Lightweight Directory Access Protocol) user database and an AD (Active Directory, Microsoft's LDAP) user database. Also as shown in the diagram, a supplicant, depicted as a laptop, connects to an access point (AP), which here is a wireless controller authenticator and which in turn connects to a AAA server (e.g., an authentication server) that has WAN link connections to the credential stores (e.g., AD and LDAP user databases) in the central office. Additionally, the AAA server has a LAN link connection to an LDAP user database in branch office, which database might have credentials for users/supplicants that are resident at the branch office but not credentials for users/supplicants that are visiting the branch office.

B. Hardware System for Authentication Server

Figure 2:
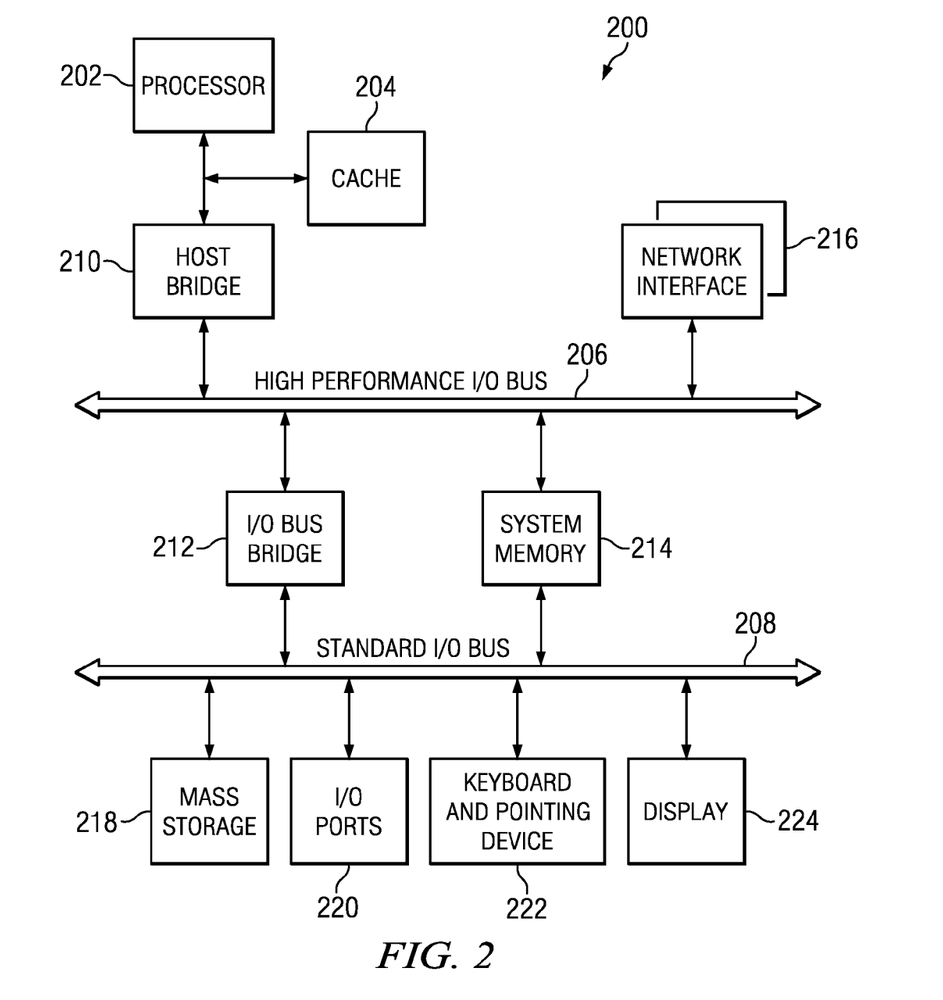
FIG. 2 is a diagram showing the hardware system for an authentication server, which might be used with some embodiments of the present invention.

FIG. 2 illustrates, for didactic purposes, a hardware system 200, for an authentication server, which might be used with some embodiments of the present invention. In one embodiment, hardware system 200 comprises a processor 202, a cache memory 204, and one or more software applications and drivers directed to the functions described herein. Additionally, hardware system 200 includes a high performance input/output (I/O) bus 206 and a standard I/O bus 208. A host bridge 210 couples processor 202 to high performance I/O bus 206, whereas I/O bus bridge 212 couples the two buses 206 and 208 to each other. A system memory 214 and multiple network/communication interfaces 216 couple to bus 206. Hardware system 200 may further include video memory (not shown) and a display device coupled to the video memory. Mass storage 218 and I/O ports 220 couple to bus 208. In some, but not all, embodiments, hardware system 200 may also include a keyboard and pointing device 222 and a display 224 coupled to bus 208. Collectively, these elements are intended to represent a broad category of computer hardware systems, including but not limited to general purpose computer systems based on the x86-compatible processors manufactured by Intel Corporation of Santa Clara, Calif., and the x86-compatible processors manufactured by Advanced Micro Devices (AMD), Inc., of Sunnyvale, Calif., as well as any other suitable processor.

The elements of hardware system 200 are described in greater detail below. In particular, network interfaces 216 provide communication between hardware system 200 and any of a wide range of networks, such as an Ethernet (e.g., IEEE 802.3) network, etc. Mass storage 218 provides permanent storage for the data and programming instructions to perform the above described functions implemented in the RF coverage map generator, whereas system memory 214 (e.g., DRAM) provides temporary storage for the data and programming instructions when executed by processor 202. I/O ports 220 are one or more serial and/or parallel communication ports that provide communication between additional peripheral devices, which may be coupled to hardware system 200.

Hardware system 200 may include a variety of system architectures; and various components of hardware system 200 may be rearranged. For example, cache 204 may be on-chip with processor 202. Alternatively, cache 204 and processor 202 may be packed together as a "processor module," with processor 202 being referred to as the "processor core." Furthermore, certain embodiments of the present invention may not require nor include all of the above components. For example, the peripheral devices shown coupled to standard I/O bus 208 may couple to high performance I/O bus 206. In addition, in some embodiments only a single bus may exist with the components of hardware system 200 being coupled to the single bus. Furthermore, hardware system 200 may include additional components, such as additional processors, storage devices, or memories.

In particular embodiments, the processes described below might be implemented as a series of software routines run by hardware system 200. These software routines comprise a plurality or series of instructions to be executed by a processor in a hardware system, such as processor 202. Initially, the series of instructions are stored on a storage device, such as mass storage 218. However, the series of instructions can be stored on any suitable storage medium, such as a diskette, CD-ROM, ROM, EEPROM, etc. Furthermore, the series of instructions need not be stored locally, and could be received from a remote storage device, such as a server on a network, via network/communication interfaces 216. The instructions are copied from the storage device, such as mass storage 218, into memory 214 and then accessed and executed by processor 202.

An operating system manages and controls the operation of hardware system 200, including the input and output of data to and from software applications (not shown). The operating system provides an interface between the software applications being executed on the system and the hardware components of the system. The present invention may be used with any suitable operating system, such as the Windows 95/98/NT/2000/XP/Vista operating system, available from Microsoft Corporation of Redmond, Wash., the Apple Macintosh Operating System, available from Apple, Inc., of Cupertino, Calif., UNIX operating systems, Linux, and the like.

C. Modules of Authentication Server

Figure 3:
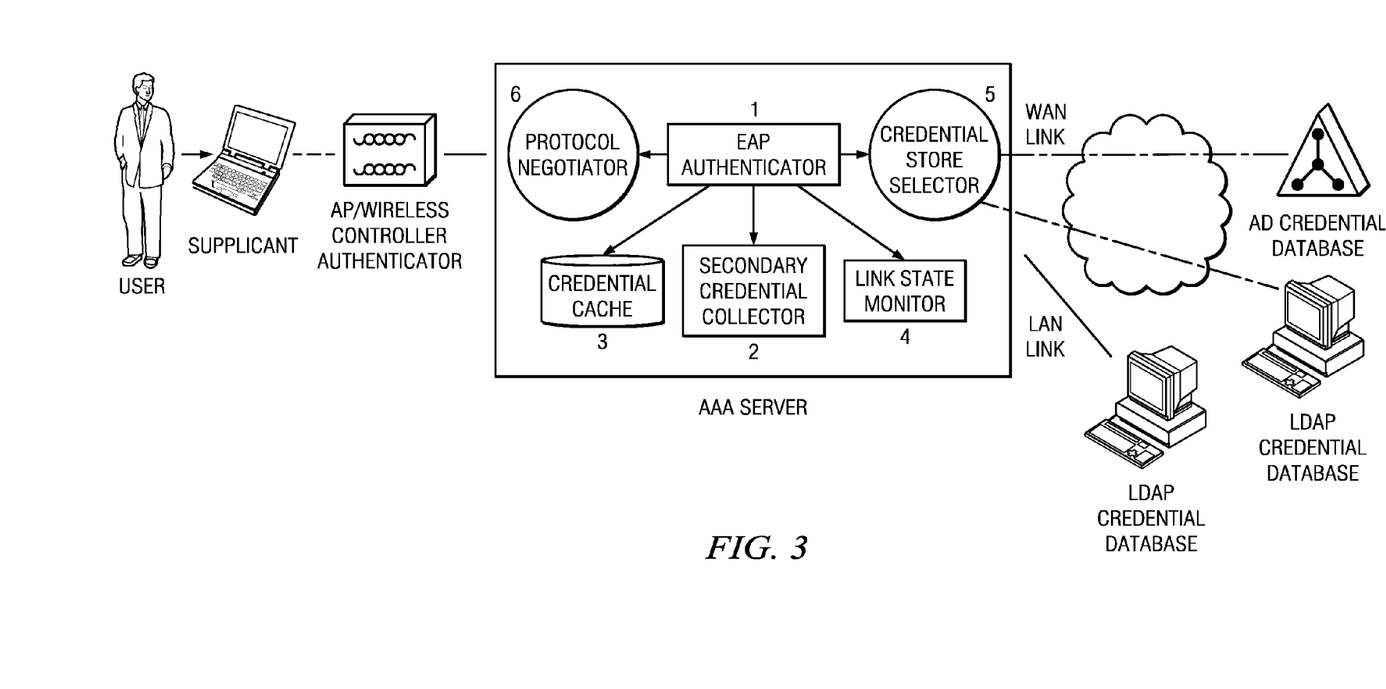
FIG. 3 is a diagram showing specific modules or components of an authentication server, which modules might be used with some embodiments of the present invention.

FIG. 3 is a diagram showing specific modules or components of an authentication server, which modules might be used with some embodiments of the present invention. As shown in the diagram, those modules might comprise: (1) an EAP authenticator; (2) a secondary credential collector; (3) a credential cache; (4) a link-state monitor; (5) a credential store selector; and (6) a protocol negotiator.

In some embodiments, the EAP authenticator controls the flow of authentication and coordinates the other components or modules, determining how to best satisfy an authentication request with the alternate authentication methods and credential stores/cache at its disposal. In making such determinations, the EAP authenticator might calculate scores for different authentication methods based on configured preferences and link and/or cache availability, as described in greater detail below.

Pursuant to one of its coordination responsibilities, the EAP authenticator might notify the secondary credential collector which authentication method can be used as a backup to the preferred authentication method and which credential store is currently being used. The secondary credential collector then can determine which additional credentials it can collect from the current credential store.

For example, the secondary credential collector might issue an AD LDAP query to get the user (or machine) certificate from the AD credential store when the EAP authenticator authenticates the user with the AD credential store using the MS-CHAP (Microsoft Challenge Handshake Authentication Protocol) authentication method. The certificate can then be used to support the EAP-TLS authentication method as a backup authentication method when the WAN link to the AD credential store is down and authentication is not possible using the EAP-MSCHAP authentication method, which does not allow for the caching of credentials.

In some embodiments, the credential cache stores the credentials collected during authentication by the EAP authenticator, as well as additional secondary credentials acquired by secondary credential collector. As suggested above, the cached credentials are used when a WAN link is down and the credential stores are unreachable.

The link-state monitor monitors the accessibility (e.g., link state) of the credential stores and provides updates to the EAP authenticator so that it can adjust the scores or availability of authentication methods accordingly. In some embodiments, the credential store selector might also utilize these updates to authenticate against a credential store known to be reachable, if the credential store corresponds to an authentication method agreed to by the supplicant.

The protocol negotiator negotiates the authentication method with the supplicant to give preference to an authentication method in which the EAP authenticator has high confidence, e.g., because the link-state monitor reports that the link to the authentication method's credential store is up or because the credential cache has a copy of the credential to satisfy the request.

D. Data Structures for Authentication

Figure 4:
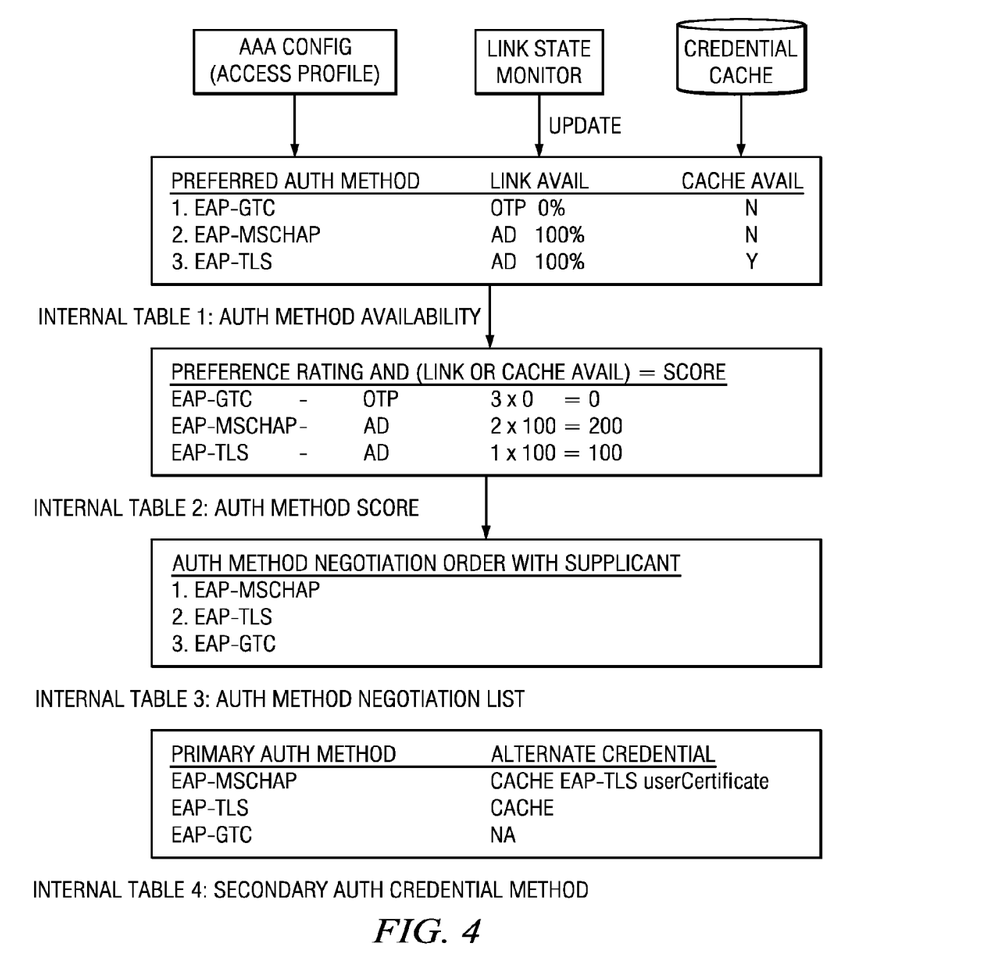
FIG. 4 is a diagram showing an example of how data structures (e.g., tables) might be used with some embodiments of the present invention.

FIG. 4 is a diagram showing an example of how data structures (e.g., tables) might be used with some embodiments of the present invention. The diagram show's four different internal tables for; (1) availability for authentication methods; (2) scores for authentication methods; (3) negotiation order for authentication methods; and (4) alternate credentials/methods for authentication methods. The first three internal tables are directly related insofar as the entries in internal table 1 give rise to the entries in internal table 2 and the entries in internal table 2 give rise to the entries in internal table 3. This is shown in the diagram by the arrows indicating flow. The fourth internal table is related to the first internal table as explained in more detail below.

Turning to the first table regarding availability, the example assumes that a system administrator has configured the following order of preference for authentication methods, e.g., through an access profile: (1) EAP-GTC; (2) EAP-MSCHAP; and (3) EAP-TLS. This order of preference might then be stored in a table in a column identified as "Preferred Auth Method", whose values might be enumerated values representing authentication methods. Also as shown in the diagram, the table might also include a column identified as "Link Avail", whose values store updates from an authentication server's link-state monitor which conducts periodic end-to-end (E2E) monitoring of the availability of the credential store utilized by a corresponding authentication method. (For example, the periodic E2E monitoring of the AD credential store might entail a synthetic authentication whose frequency is configurable.) In some embodiments, the entries in these columns might be percentages, reflecting a moving average value for a series of updates over a particular period of time (e.g., the credential store was available during 50% of the updates taking place in the last 15 minutes). Other embodiments might use a variation on a moving average, such as attempting a synthetic authentication 3 times every 5 minutes and then taking the average of those attempts, as is done with the "ping" utility. According to the "Link Avail" column in the example, the link availability (using a one-time password or OTP) for the EAP-GTC authentication method is 0%, the link availability (using an AD credential store) for the EAP-MSCHAP authentication method is 100%, and the link availability (using an AD credential store) for the EAP-TLS authentication method is 100%. Finally, the first internal table in FIG. 4 might additionally include a column identified as "Cache Avail", whose values store a Boolean flag indicating whether a corresponding authentication method currently has cached credentials in the authentication server's credential cache. According to this column in the example, only the EAP-TLS authentication method currently has cached credentials; the EAP-GTC and EAP-MSCHAP authentication methods do not, possibly because their protocols do not permit the caching of credentials. It will be appreciated that the values in columns "Link Avail" and "Cache Avail" allow the authentication server to determine a probability as to whether a particular authentication method is actually available at run time.

The second internal table in FIG. 4 pertains to scores for authentication methods, which scores might be calculated by an authentication server's EAP authenticator in some embodiments. As shown in this table the score for the EAP-GTC authentication method (which uses OTP) is 0 (3×0), the score for the EAP-MSCHAP authentication method (which uses the AD credential store) is 200 (2×100), and the score for the EAP-TLS authentication method (which uses the AD credential store) is 100 (1×100). Here it will be appreciated that the score for each authentication method is obtained by multiplying a weight corresponding to its relative configured rank times the authentication method's link or cache availability as recorded in internal table 1. Thus, since there were only three authentication methods, the weight for the preferred (e.g., ranked first pursuant to the configuration) authentication method is 3, the weight for the next preferred authentication method is 2, and the weight for the least preferred authentication method is 1.

In some embodiments, when the values for both link availability and cache availability for an authentication method are more than zero, the score might be based on the greater of these two values. However, in the event that the authentication server and the supplicant agree on an authentication method that currently has cached credentials (e.g., its cache availability is 100%), the authentication server might nonetheless verify against the credential store rather than the cached credentials, for security purposes, if the credential store is available at run time.

The third internal table in FIG. 4 sets forth a negotiation order for the authentication methods, based on the scores calculated in internal table 2. It will be appreciated that the authentication server (e.g., the protocol negotiator described above) might use this negotiation order when negotiating with the supplicant, in some embodiments. Since the score for the EAP-MSCHAP authentication method was 200, this authentication method is first in the negotiation order, followed by the EAP-TLS authentication method, whose score was 100. The last authentication method in the negotiation order is the method preferred by the system administrator, EAP-GTC, since its link availability was 0% and it has no cache availability.

The fourth internal table in FIG. 4 relates authentication methods to their alternate credentials/methods. This table is configured by the system administrator, in some embodiments. As shown in this table, when the primary authentication method is EAP-MSCHAP, the authentication server (e.g., the secondary credential collector described above) will cache the userCertificate for the EAP-TLS authentication method as an alternate credential, since the protocol for EAP-MSCHAP does not allow for the caching of its credentials and the protocol for EAP-TLS does. Similarly, when the primary authentication method is EAP-TLS, the authentication server will simply cache the userCertificate for the EAP-TLS authentication method, so that the authentication server itself can perform the authentication in the event that the link to the AD credential store goes down. Finally, when the primary authentication method is EAP-GTC, alternate credentials are not available. Upon the caching of a credential for an authentication method, the authentication server updates the corresponding entry in the "Cache Avail" column in the first internal table to indicate the availability of the cached credential.

E. Processes for Authentication

Figure 5:
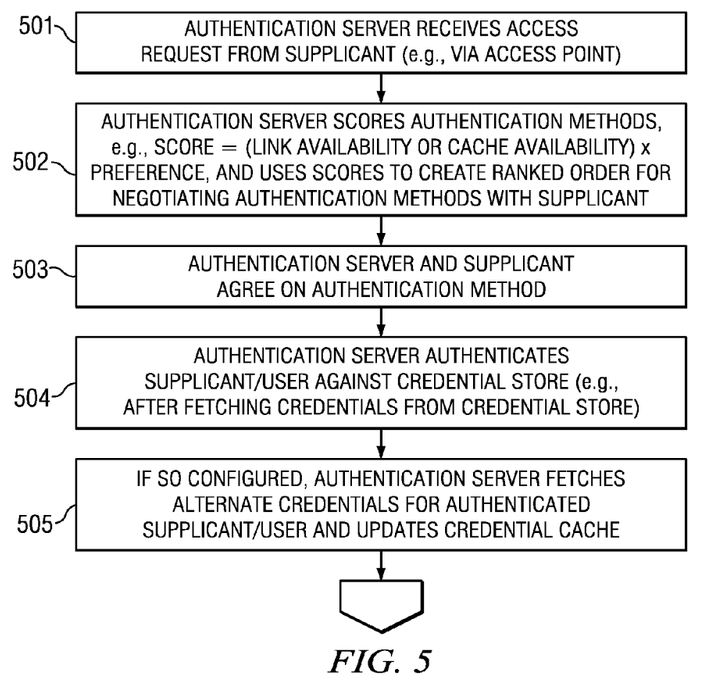
FIG. 5 is a diagram showing a flowchart of a process for authenticating a supplicant/user and gathering alternate credentials, which process might be used with some embodiments of the present invention.

FIG. 5 is a diagram showing a flowchart of a process for authenticating a supplicant/user and gathering alternate credentials, which process might be used with some embodiments of the present invention. The premise for the flowchart is that the protocol for the agreed authentication method does not allow for cacheable credentials, though such credentials are allowed by the protocol for another configured authentication method. In the process's first Step 501, the authentication server receives an access request from a supplicant via an access point. In step 502, the authentication server's EAP authenticator scores the authentication methods, using configured preferences and link/cache availability, and then uses the scores to create a ranked order for negotiations of an authentication method with the supplicant, as described earlier. Then in step 503, the authentication server and the supplicant agree on an authentication method and, in step 504, the authentication server authenticates the supplicant/user against a credential store (e.g., following a fetch of the credentials from the credential store). Finally, in step 505, the authentication server's secondary credential collector fetches alternate credentials (e.g., userCertificate for the EAP-TLS authentication method) for the authenticated supplicant/user, if so configured, and updates the credential cache.

Figure 6:
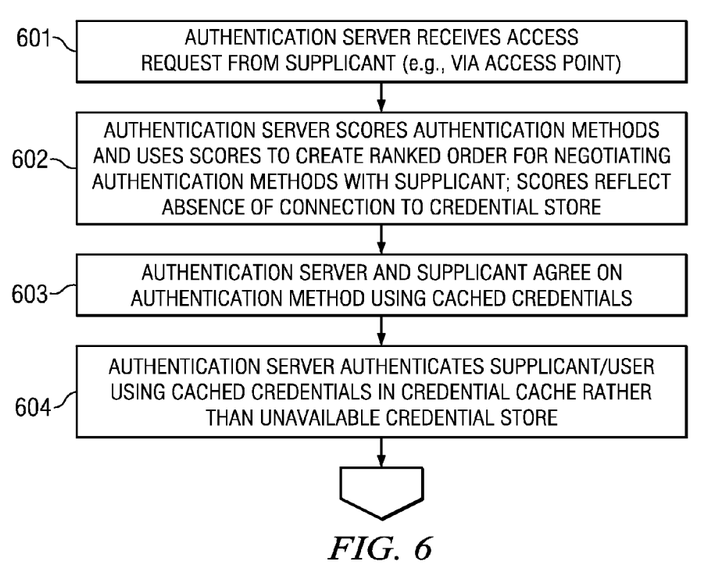
FIG. 6 is a diagram showing a flowchart of a process for authenticating a supplicant/user with cached credentials, which process might be used with some embodiments of the present invention.

FIG. 6 is a diagram showing a flowchart of a process for authenticating a supplicant/user with alternate credentials, which process might be used with some embodiments of the present invention. The premise for the process is that the WAN link to the credential store is down. The first three steps of this process are similar to the first three steps of the prior process. In the process's first step 601, the authentication server receives an access request from a supplicant via an access point. In step 602, the authentication server's EAP authenticator scores the authentication methods, using configured preferences and link/cache availability, and then uses the scores to create a ranked order for negotiations of an authentication method with the supplicant, as described above. It will be appreciated that the scores and ranked order reflect the absence of a connection to the credential store. Then in step 603, the authentication server and the supplicant agree on the authentication method that uses cached credentials and, in step 604, the authentication server authenticates the supplicant/user using the credentials (e.g., userCertificate for the EAP-TLS authentication method) in the credential cache, rather than making a futile effort to contact the credential store.

Figure 7:
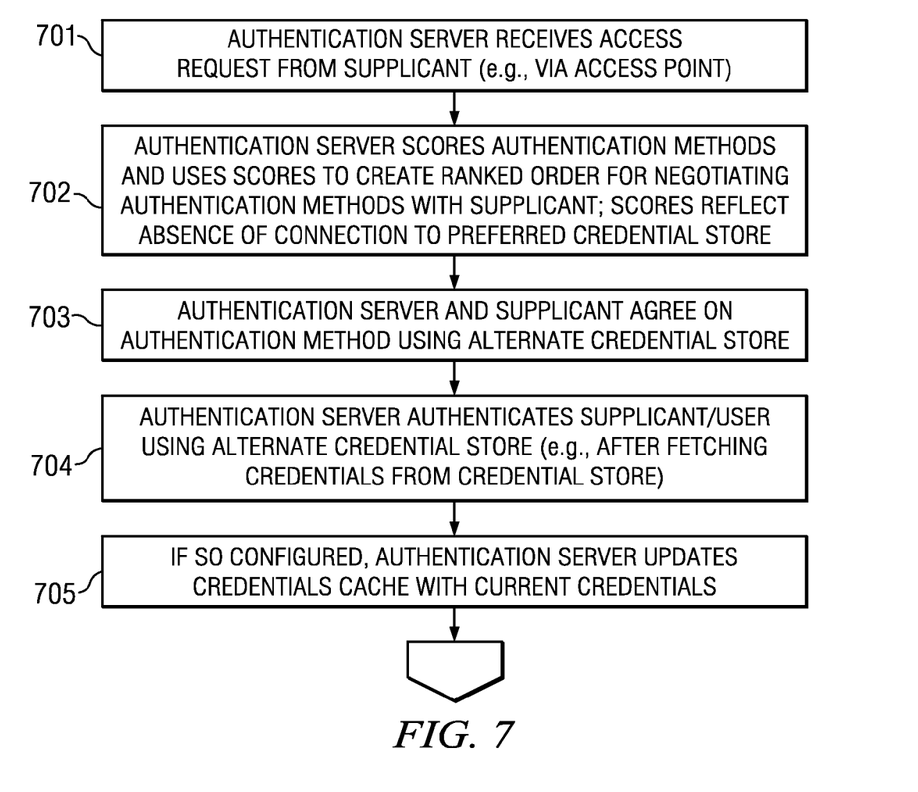
FIG. 7 is a diagram showing a flowchart of a process for authenticating a supplicant/user with an alternate credential store, which process might be used with some embodiments of the present invention.

FIG. 7 is a diagram showing a flowchart of a process for authenticating a supplicant/user with an alternate credential store, which process might be used with some embodiments of the present invention. The premise for the process is that the WAN link to the preferred credential store is down, but the WAN link to another credential store is up. Further, the protocol for the agreed authentication method does allow for cacheable credentials. The first three steps of this process are similar to the first three steps of the prior two processes. In the process's first step 701, the authentication server receives an access request from a supplicant via an access point. In step 702, the authentication server's EAP authenticator scores the authentication methods, using configured preferences and link and cache availability, and then uses the scores to create a ranked order for negotiations of an authentication method with the supplicant, as described above. It will be appreciated that the scores and ranked order reflect the absence of a connection to the preferred credential store. Then in step 703, the authentication server and the supplicant agree on the authentication method that uses the alternate credential store and, in step 704, the authentication server authenticates the supplicant/user against the alternate credential store (e.g., following a fetch of the credentials from the alternate credential store), rather than against the preferred credential store which is unavailable. Finally, in step 705, the authentication server's secondary credential collector updates the credential cache with the current credentials received from the alternate credential store, if so configured.

Particular embodiments of the above-described processes might be comprised of instructions that are stored on storage media. The instructions might be retrieved and executed by a processing system. The instructions are operational when executed by the processing system to direct the processing system to operate in accord with the present invention. Some examples of instructions are software, program code, firmware, and microcode. Some examples of storage media are memory devices, tape, disks, integrated circuits, and servers. The term "processing system" refers to a single processing device or a group of inter-operational processing devices. Some examples of processing devices are integrated circuits and logic circuitry. Those skilled in the art are familiar with instructions, storage media, and processing systems.

Those skilled in the art will appreciate variations of the above-described embodiments that fall within the scope of the invention. In this regard, it will be appreciated that there are many possible orderings of the steps in the processes described above and many possible modularizations of those orderings. Also, there are many possible divisions of these orderings and modularizations between different hardware/software systems in the network environment, e.g., the access point and the authentication server. As a result, the invention is not limited to the specific examples and illustrations discussed above, but only by the following claims and their equivalents.

What is claimed is:

1. A method, comprising:
periodically determining, by an authentication server, availability of a credential store over a network connecting the credential store to the authentication server;
generating, at the authentication server, an ordered sequence of one or more authentication methods, wherein generating the ordered sequence comprises scoring each of the one or more authentication methods and, based at least on the scoring, ranking each of the one or more authentication methods in order to generate the ordered sequence, wherein the ordered sequence is based at least in part on the determined availability to the authentication server of a credential store for the one or more authentication methods;
responsive to an access request from a supplicant for access to a network, negotiating with the supplicant an authentication method according to the ordered sequence; and
authenticating the supplicant using the negotiated authentication method to allow access to the network.

2. A method as in claim 1, further comprising the step of fetching a credential for the negotiated authentication method from a credential store and caching the credential at the authentication server, if caching is allowed by an authentication protocol corresponding to the negotiated authentication method.

3. A method as in claim 2, wherein the fetched and cached credential is for an authentication method other than the negotiated authentication method.

4. A method as in claim 2, wherein the credential to be fetched and cached is configurable.

5. A method as in claim 2, wherein the ordered sequence is based at least in part on the fetching and caching of a credential for the one or more authentication methods from a credential store.

6. A method as in claim 1, wherein the ordered sequence is based at least in part on configurable preferences for authentication methods.

7. A method as in claim 5, wherein the ordered sequence is based at least in part on configurable preferences for authentication methods.

8. Software encoded in one or more non-transitory computer-readable media and when executed operable to:
periodically determine, by an authentication server, availability of a credential store over a network connecting the credential store to the authentication server;
generate, at the authentication server, an ordered sequence of one or more authentication methods, wherein the software when executed operable to generate the ordered sequence is further operable when executed to score each of the one or more authentication methods and, based at least on the scoring, rank each of the one or more authentication methods in order to generate the ordered sequence, wherein the ordered sequence is based at least in part on the determined availability to the authentication server of a credential store for the one or more authentication methods;
responsive to an access request from a supplicant for access to a network, negotiate with the supplicant an authentication method according to the ordered sequence; and
authenticate the supplicant using the negotiated authentication method to allow access to the network.

9. Software as in claim 8, further comprising the step of fetching a credential for the negotiated authentication method from a credential store and caching the credential at the authentication server, if caching is allowed by an authentication protocol corresponding to the negotiated authentication method.

10. Software as in claim 9, wherein the fetched and cached credential is for an authentication method other than the negotiated authentication method.

11. Software as in claim 9, wherein the credential to be fetched and cached is configurable.

12. Software as in claim 9, wherein the ordered sequence is based at least in part on the fetching and caching of a credential for the one or more authentication methods from a credential store.

13. Software as in claim 8, wherein the ordered sequence is based at least in part on configurable preferences for authentication methods.

14. Software as in claim 12, wherein the ordered sequence is based at least in part on configurable preferences for authentication methods.

15. An apparatus, comprising:
means for periodically determining, at an authentication server, availability of a credential store over a network connecting the credential store to the authentication server;
means for generating, at the authentication server, an ordered sequence of one or more authentication methods, wherein the means for generating the ordered sequence comprises means for scoring each of the one or more authentication methods and, based at least on the scoring, means for ranking each of the one or more authentication methods in order to generate the ordered sequence, wherein the ordered sequence is based at least in part on the determined availability to the authentication server of a credential store for the one or more authentication methods;
responsive to an access request from a supplicant for access to a network, means for negotiating with the supplicant an authentication method according to the ordered sequence; and
means for authenticating the supplicant using the negotiated authentication method to allow access to the network.

16. An apparatus as in claim 15, further comprising means for fetching a credential for the negotiated authentication method from a credential store and caching the credential at the authentication server, if caching is allowed by an authentication protocol corresponding to the negotiated authentication method.

17. An apparatus as in claim 16, wherein the ordered sequence is based at least in part on the fetching and caching of a credential for the one or more authentication methods from a credential store.

* * * * *